United States Patent Office 3,676,263
Patented July 11, 1972

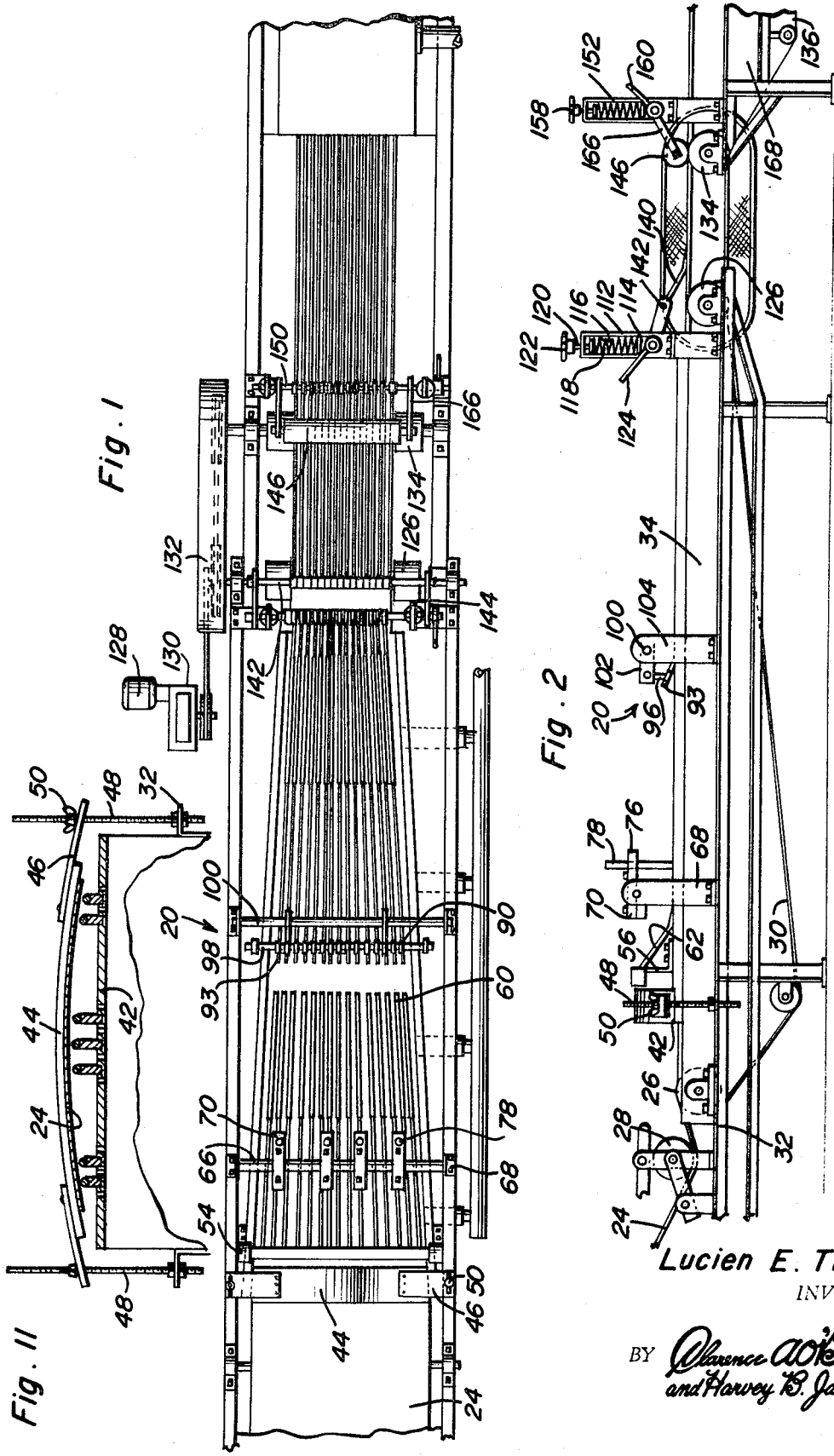

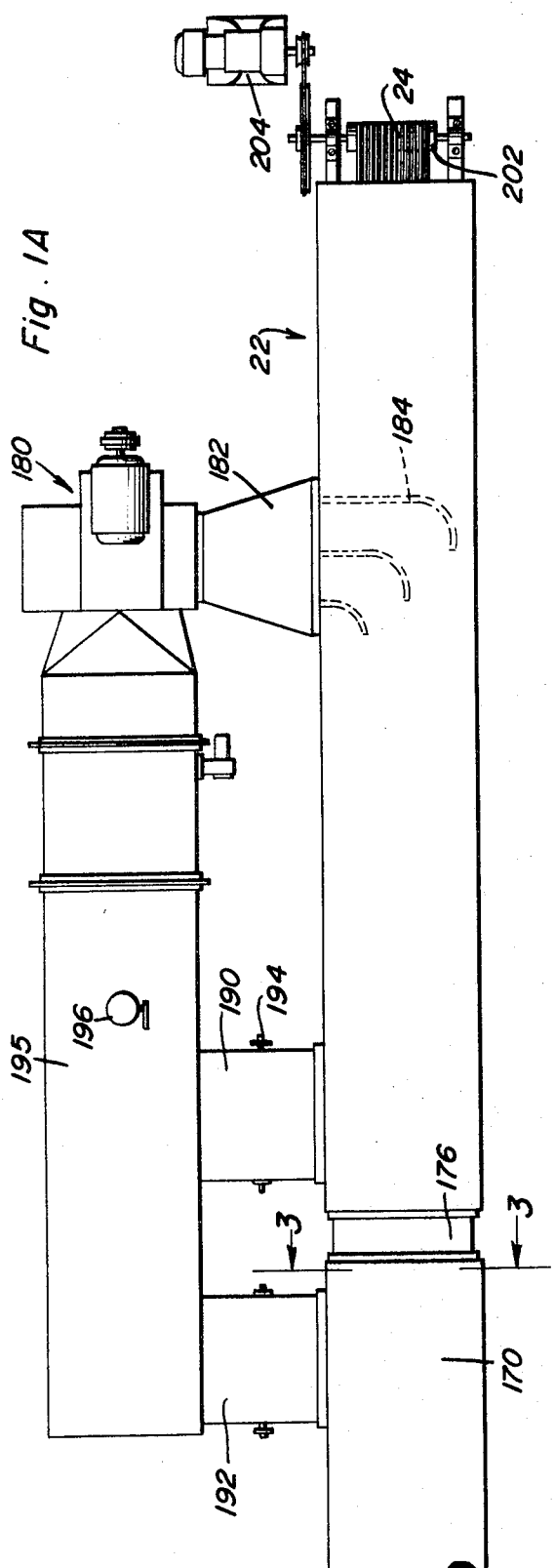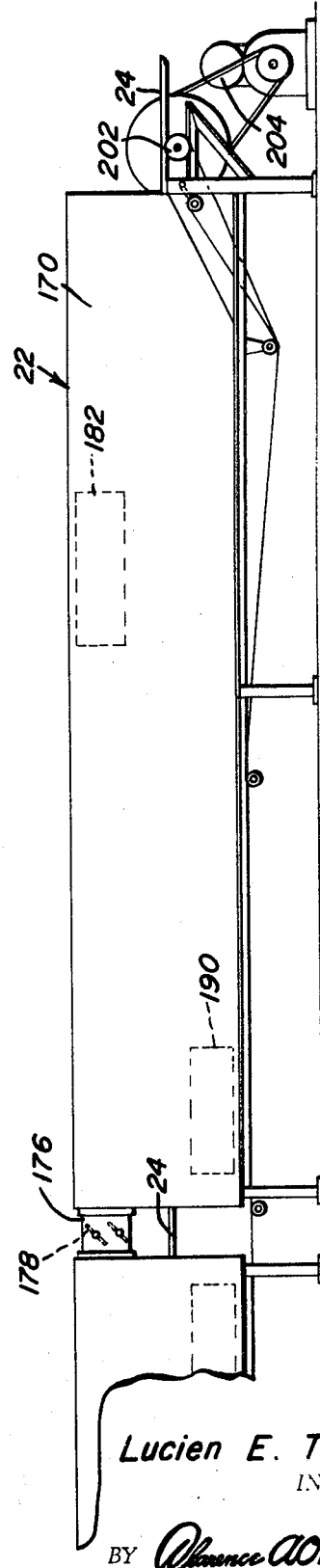

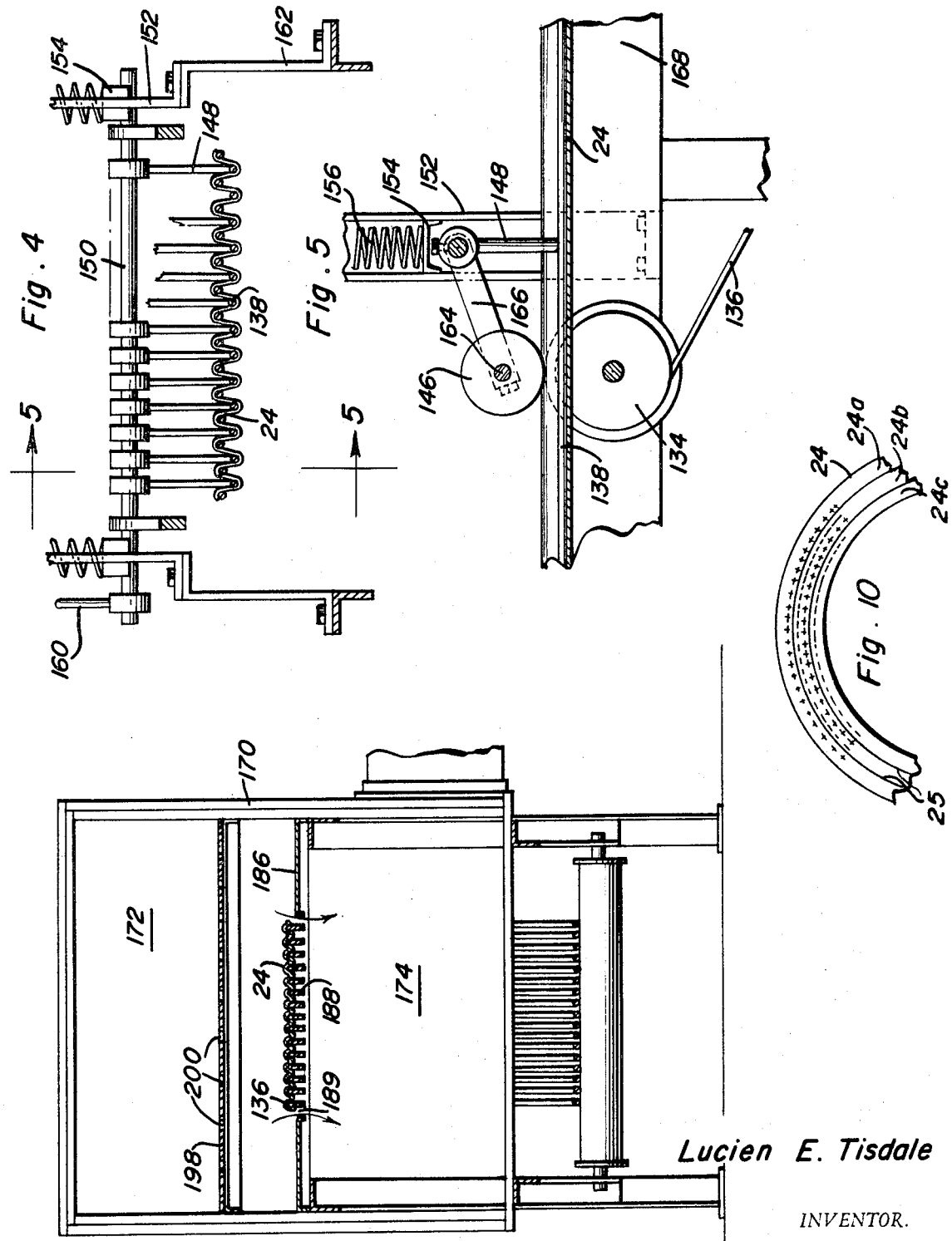

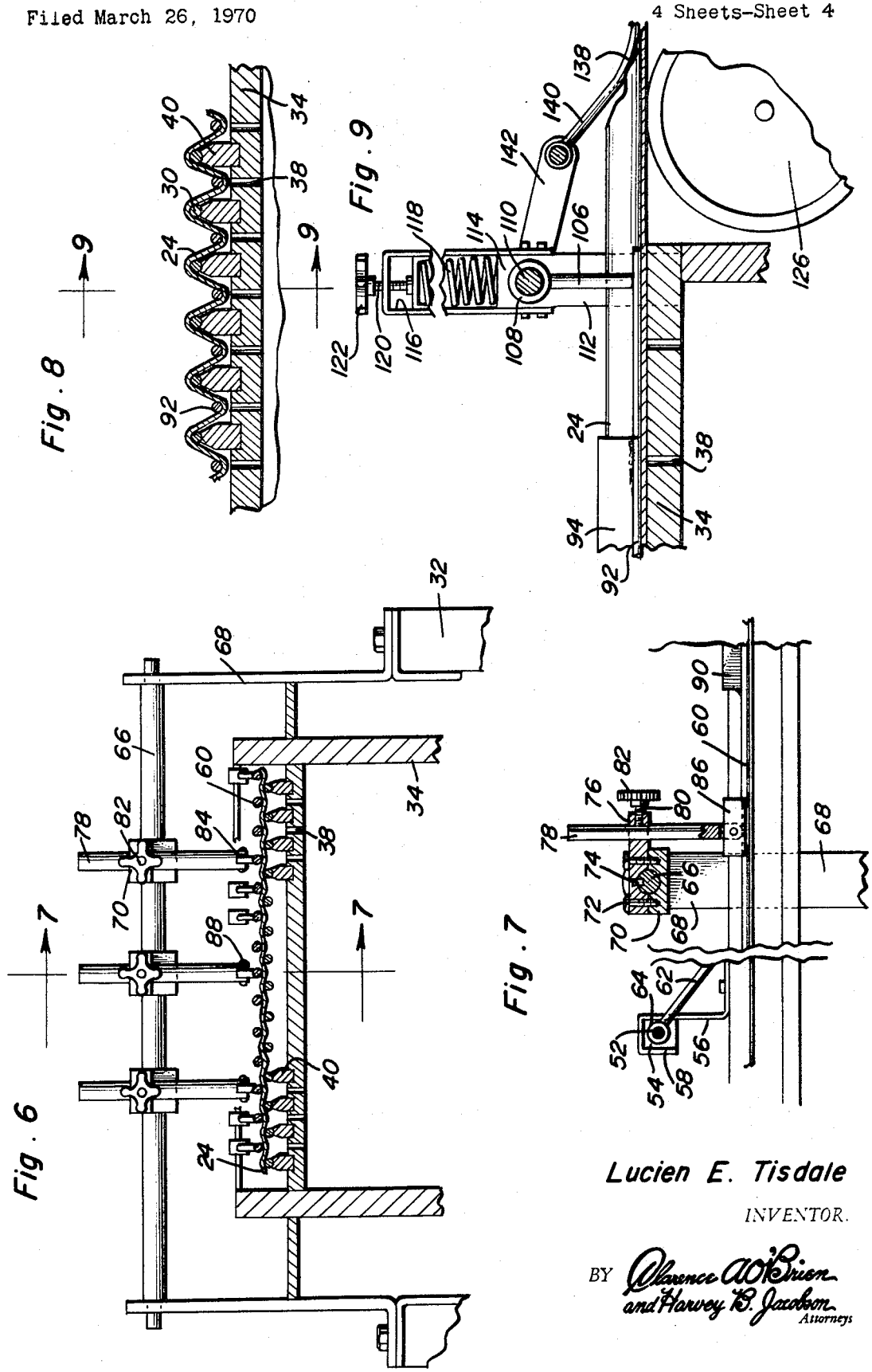

3,676,263
MACHINE FOR MAKING STRESS LAMINATED PANEL
Lucien E. Tisdale, Monroe, La., assignor to Ridge Ply, Inc.
Filed Mar. 26, 1970, Ser. No. 22,850
Int. Cl. B31f 1/24
U.S. Cl. 156—462                                    8 Claims

ABSTRACT OF THE DISCLOSURE

A corrugated laminated panel in which a multiplicity of flat webs of paper are glued together and while the glue is still soft, the laminated web is fluted or corrugated longitudinally in a converging process which convolutes the individual plies of the laminated panel, incrementally stretching the fibers on the outside of the bends and conversely compressing the fibers on the inside of the bends. The fluting machine includes a drag shoe engaging a transversely curved surface to impart drag against the laminated sheet to assure that the sheet will stay smooth and eliminate slack. The fluting machine also includes adjustable pressure points which may be adjusted to assure uniformity of the flutes formed in the web. The fluting machine also includes spring loaded fingers to remove variations in flute development to further assure uniformity of the flutes. A drying tunnel is provided with guide rods providing a downward force to hold the laminated sheet in contact with supporting belts in the drying tunnel, and is heated by an air system including air impingement on the panel at relatively high velocity which dries the adhesive in the panel and at the same time serves to retain the panel or sheet on the supporting belt assembly therefor.

---

The present invention generally relates to a laminated panel and a machine for making such a panel and includes improvements in structure and operational procedure of the apparatus disclosed in my prior Pat. No. 3,178,494 issued Apr. 13, 1965.

In my prior Pat. No. 3,178,494, a sheet of material was conveyed over a support that included longitudinal ridges and grooves and a vacuum source communicated through the ridges and grooves to hold the sheet of material against the ridges and grooves during longitudinal movement thereof. The support was formed by a plurality of flexible belts which converge toward the discharge end of the machine in order to form longitudinal corrugations longitudinally of the sheet of material.

An object of the present invention is to provide a laminated panel in which a plurality of webs of paper are laminated with a complete glue coverage therebetween. This laminated web is then passed through the fluting machine of the invention which forms longitudinal corrugations in the web prior to the glue hardening. Formation of the longitudinal corrugations in the laminated web incrementally stretches the fibers on the outside of each bend in each individual ply of the laminated web and at the same time compresses the fibers on the inside of the bends before the glue hardens. In the uncured state, the stretched fibers are closely bound to compressed fibers and the wet glue serves as a lubricant between the plies of the laminated web thus permitting the fluting or forming action to take place without requiring undue force. The laminated formed panel is held in its fluted condition while being cured in a drying tunnel so that curing of the glue effectively "locks" the structure together so that the convoluted shape is held by the cementing action of the glue joining the compressed and stretched fibers which permits this product to maintain its shape and rigidity with no tendency of the flutes to flatten out after forming There can be no flattening or distortion in the finished panel unless the glue bond fails or is caused to soften.

Another object of the machine is to introduce a transverse convex curved surface to the fluting machine which eliminates undesirable wrinkling of the laminated web caused by the converging action of the fluter creating slack as the flat web leaves a tail pulley. A flexible drag shoe is provided in engagement with the flat transversely curved web to assure that it will conform to the curved surface and to introduce drag on the web to further eliminate wrinkling.

Still another object of the invention is to provide a fluting machine incorporating adjustable pressure elements to introduce pressure on the flutes as may be necessary to provide uniform flute development during movement of the laminated web through the fluting machine as it passes over the vacuum box.

Yet another object of the present invention is to provide a fluting machine including longitudinal rods and spring loaded fingers to further aid in the uniform development of the flutes and to insure tight contact between the various plies of the laminated web to eliminate any possible delamination occurring while the fluting machine is in operation.

A further important object of the present invention is to provide an additional set of fixed rods extending into a drying tunnel to provide a downward force to hold the laminated web in close contact with the travelling belt in the drying tunnel and maintain its fluted shape until the heat in the drying tunnel cures the adhesive to a point where the panel will hold its shape unaided. The rods extending into the drying tunnel also are provided with spring-loaded fingers.

Still another important object of the present invention is to provide a fluting machine having a drying tunnel discharging heated air directly onto the laminated web at relatively high velocity which not only dries the adhesive but also serves to facilitate retention of the laminated web against the supporting belts with the drying tunnel also having a vacuum induced in the lower portion thereof below the travelling belts and web to further retain the laminated web in position on the travelling belts.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGS. 1 and 1A is a plan view of the fluting machine of the present invention illustrating schematically the orientation of the components thereof.

FIGS. 2 and 2A is a side elevational view of the fluting machine.

FIG. 3 is a transverse, sectional view taken substantially upon a plane passing along section line 3—3 of FIG. 1A illustrating the construction of the drying tunnel.

FIG. 4 is a transverse, sectional view illustrating the guide rods and fingers engaged therewith to facilitate uniform development of the flutes.

FIG. 5 is a sectional view, on an enlarged scale, taken substantially upon a plane passing along section line 5—5 of FIG. 4 illustrating the spring fingers and rods engaging the laminated web.

FIG. 6 is a transverse sectional view illustrating adjustable pressure points employed with the forming rods to facilitate uniformity of the flutes as they are being formed.

FIG. 7 is a detailed sectional view taken substantially upon a plane passing along section line 7—7 of FIG. 6 illustrating further structural details of the adjustable pressure point.

FIG. 8 is a transverse, sectional view, on an enlarged scale illustrating additional forming rods employed with the laminated web and travelling belt support.

FIG. 9 is a sectional view taken substantially upon a plane passing along section line 9—9 of FIG. 8 illustrating further structural details of the structure of FIG. 8.

FIG. 10 is a detail view of the laminated web illustrating the structure thereof.

FIG. 11 is a detailed view illustrating the drag shoe and convex curvature thereof.

Referring now specifically to the drawings, the fluting machine of the present invention is generally designated by reference numeral 20 with the drying tunnel portion thereof illustrated in FIGS. 1A and 2A generally being designated by the numeral 22.

A laminated web 24 in the form of a multiple of sheets of paper, paperboard, kraft paper or the like, such as employed in the construction of corrugated cardboard or the like such as that disclosed in prior Pat. No. 3,178,494 is supplied to the fluting machine 20 in a flat condition with the plies of the paper web 24 being secured together by glue which has not been cured, thus providing a flat laminated web 24 which is soft and subject to being formed into a longitudinally corrugated laminated panel. The laminated web 24 passes over a tail pulley 26 which is peripherally grooved and receives a plurality of endless supporting belts 30 which extend longitudinally from the tail pulley 26 and converge in a longitudinal direction in generally the same manner as the structure illustrated in prior Pat. No. 3,178,494. The web 24 is retained in flat and taut condition by a holddown roller 28 which is disposed in overlying relation to the web 24. The tail pulley 26 and the roller 28 is supported in any convenient manner from a supporting framework 32.

Underlying the upper run of the belts 30 is a vacuum box 34 having a plurality of apertures 38 therein which communicate with spaces between supporting ridge members 40. The supporting members 40 are secured to the top surface of the vacuum box 34 in any suitable manner and has an upwardly tapering apex supporting the conveyor belt 30 which is preferably circular in configuration so that the portion of the web 24 between the ridge members 40 and between the belts 30 will be pulled downwardly into the space between the belts 30 and between the ridge members 40 thus defining corrugations in the web 24 and act at the same time reducing the transverse dimension of the web 24 in generally the same manner as the structure disclosed in prior Pat. No. 3,178,494.

Where the belts 30 approach the vacuum box 34, the profile of the supporting surface is transversely curved in a convex manner with this surface being designated by the numeral 42 and a transversely extending drag shoe 44 is provided in dragging engagement with the top surface of the web 24. The drag shoe 44 is in the form of a resilient member of metal or the like having projecting ends 46 received on upstanding threaded bolts 48 secured to the frame 32 in any suitable manner together with a wing nut or other adjustable nut 50 being provided thereon for varying the tension of the drag shoe 44 against the web 24. The undersurface of the drag shoe 44 where it engages the laminated web 24 may be faced with various materials such as a resilient material or the like, wood, plastic or other materials having relatively long wearing qualities but which may be easily replaced if desired. The convex curvature of the drag shoe and the underlying supporting surface 42 eliminates undesirable wrinkling of the laminated web 24 at this transition point which is caused by the converging action of the fluting machine creating slack as the flat web leaves the tail pulley 26. The drag shoe 44 insures that the web 24 stays smooth and runs tight against the belts 30. The backing piece of the drag shoe 44 is a flexible resilient member so that it will conform to the curved surface of the web 24 and the transition surface 42.

Extending transversely above the entrance end of the conveyor belt assembly and vacuum box, a transversely extending rod 52 is supported by end brackets 54 which have a downwardly offset supporting foot 56 attached to the frame in any suitable manner. The brackets receive an angulated member 58 which forms a guide for the front and top of the rod 52. The rod 52 pivotally supports a plurality of elongated longitudinally extending rods 60 of circular cross-sectional configuration with the forward ends of the rods 60 being upwardly inclined as at 62 and terminating in eyes or loops 64 which are freely received on the rod 52 for free swinging movement. As illustrated in FIG. 6, the rods 60 engage the upper surface of the laminated web 24 intermediate or between the belts 30 which are supported on the ridge members 40 to exert a force against the upper surface of the web and distribute each forces longitudinally of the machine.

Disposed in spaced relation to the transverse supporting rod 52 for the rods 60 is a transversely extending mounting rod 66 supported from the frame 32 by suitable brackets 68. Slidably mounted on the rod 66 is a plurality of split clamps 70 with the two components of the split clamps 70 being secured together by clamp bolts 72 and each clamp being keyed to the shaft 66 for longitudinal slidable movement by a conventional longitudinal key 74 disposed in a longitudinally continuous keyway formed in the top surface of the shaft 66. Thus, the brackets 70 are slidable transversely of the laminated web 24 along the shaft 66 are keyed thereto so that they will be rigid insofar as rotation is concerned inasmuch as the shaft 66 is also fixed to the brackets 68. Each bracket 70 is provided with a projection 76 having a vertical bore extending therethrough slidably receiving a mounting rod 78. The mounting rod 78 is retained in vertically adjusted position by a clamp screw 80 having a hand wheel or knob 82 thereon with the clamp screw 80 serving as a setscrew for varying the vertical adjustable position of the vertical rod 78.

The lower end of the vertical rod 78 is bifurcated as at 84 and receives a pressure shoe 86 therein with the pressure shoe being attached to the bifurcated end 84 by a fastening bolt, rivet or the like 88 which enables some relative movement of the pressure shoe in relation to the rod 78 inasmuch as the supper edge of the pressure shoe 68 is slightly spaced from the upper limit of the bifurcation. The lower edge of the pressure shoe 86 is engaged with the rod 60 and is semi-cylindrical in configuration for this purpose and thus provides a pressure point for exerting downward pressure on selected rods 60. With this construction, adjustable pressure points are provided for the rods 60 which can be set individually to put additional pressure on a flute which is running too shallow thereby forcing a redistribution of the web 24 on the carrying belts 30 and insuring that all flutes are the same depth leaving the machine. In operation, the rods 78 are adjustably positioned in the bracket 70 and clamped to provide the needed force. Adjustment is provided in both the vertical direction and horizontal lateral direction and the rods 60 distribute the forces uniformly along the flute length. The rods 60 are pivoted at the entrance end of the fluting machine and extend longitudinally approximately half its length with each of the rods 60 being held in its respective groove or flute by its own weight as the web slides under the rod 60, the pressure of force operates in the same direction as the force on the web created by the vacuum in the vacuum box thus facilitating formation of the flutes. Also, each of the rods 60 is provided with a bar 90 on the trailing end portion thereof which serves as an added weight. The bars 90 are positioned rigidly on the rods 60 as by welding or the like and extends from a point rearwardly of the pressure shoe 86 to a point adjacent the trailing ends of the rods 60 as illustrated in FIG. 9.

Rearwardly of the set of rods 60, there is a second set of rods 92 which have weights 94 thereon similar to the weights 90. The forward or leading ends of the rods 92 are slightly upturned as at 93 and are supported by rods 96 from a transverse rod 98 disposed forwardly of a mounting rod 100 by brackets 102. The mounting rod 100 extends transversely of the vacuum box and is supported from the frame 32 by suitable brackets 104. The length of the fixed rods 92 are generally equal to the rods 60 and extend throughout the length of the trailing half of the fluter. The trailing ends of the rods 92 are engaged by a plurality of vertically disposed fingers 106 which terminate in a cylindrical mounting ring 108 engaging a shaft 110 which extends transversely of the frame 32 in vertically spaced relation to the trailing ends of the rods 92. The ends of the shaft 110 extend through vertically disposed brackets 112 supported from the frame in a suitable manner with the bearing block 114 for each end of the shaft 110 being vertically reciprocally mounted in a slot 116 in the bracket 112 and a coil spring 118 is disposed against the bearing block 114 and urges the bearing block downwardly thus spring-biasing the fingers downwardly. The upper end of the spring 118 is engaged by a threaded member 120 extending through the upper end of the bracket 112 with a hand wheel or knob 122 being provided on the threaded member 120 to manipulate the threaded member and thus increase or decrease the tension on the spring 118. One end of the rod or shaft 110 is provided with an offset handle 124 by which the shaft 110 may be pivoted to quickly release all of the fingers 106 from engagement with the rods 92. Each rod 92 operates similar to the rods 60 with each rod lying in its respective flute with the diameter of the rod substantially equal to the desired inside diameter of the flutes in the laminated web. The rods 92 also serve to insure tight contact between the various plies of the laminated web in order to prevent delamination thereof while the machine is in operation.

At the trailing end of the rods 92, a grooved pulley 126 is supported on the frame 32 and is grooved and provided with recesses conforming in shape with the shape and configuration of the ridges 40 so that the belts 30 which ride the apices of the ridges 40 engage peripheral grooves in the pulley 126 in substantially a straight condition so that support will be provided for the web to a point at the top center of the pulley 126. Intermediate the grooves which receive the belts 30, the pulley 126 will be recessed or grooved to receive the lower edges of the valleys which were formed by the rods 60 and 92 so that as the corrugated paper web is discharged from the fluter, the web will be oriented in a straight condition longitudinally and corrugated and of a reduced width. Suitable driving mechanism may be provided for the pulley 126 such as a motor 128, a reduction unit 130, a belt drive with protective housing assembly 132 to enable rotation of the pulley 126 at a desired speed.

From the fluter, the web 24 passes into the dryer which includes an end pulley 134 carried by a supporting frame and driven by the same drive assembly 132 as is the roller 126. The pulley 134 also is recessed peripherally and provided with ridges which are grooved to receive endless belts 136 in the same horizontal plane as the belts 30 for reception in the undersurface of the apices of the web 24. A third set of shaping rods 138 are provided in the upwardly facing valleys in the web with the rods 138 having upwardly inclined forward ends 140 which bridge the space between the pulleys 126 and 134 and which are supported by a transverse rod 142 supported from a pair of brackets 144 which are attached to the transverse rod 110 to stationarily support the forward ends of the rods 138 which are cylindrical and are received on the rod 142 for free movement whereby the weights of the rods will retain them in the grooves in the corrugated laminated panel. The rods 138 extend beyond the pulley 134 and into the dryer for a substantial length. A roller 146 overlies the pulley drum 134 and engages the rods and the laminated web to hold the laminated web in close contact with the travelling belts 138 in the dryer 22 thereby maintaining its fluted shape until heat in the dryer cures the adhesive to a point where the panel will hold its shape unaided.

Another set of spring loaded fingers 148 are provided in upstanding relation to the rods 138 with the fingers 148 being mounted on a transverse shaft 150 journalled in brackets 152 by bearing blocks 154. The brackets 152 are slotted and the bearing blocks 154 are spring biased downwardly by a spring 156 which has the upper end thereof engaged by a hand wheel operated threaded member 158 by virture of which pressure on the fingers 148 may be varied. One end of the shaft 150 is provided with a handle 160 to enable rotation of the shaft 150 and thus quick release of all the spring fingers 148. The bracket 152 is supported from the supporting framework by a bracket structure 162 and the supporting rod or shaft 164 for the roller 148 is pivotally supported from the shaft 150 by supporting arms 166 which enables pivotal movement of the fingers 148 to occur without changing the position of the roller 146. A vacuum box 168 extends from the pulley 134 and becomes a part of the dryer as set forth hereinafter with the supports for the belts 136 being the same as employed in conjunction with the vacuum box 34.

The dryer 22 includes an elongated housing 170 which is divided into an upper compartment 172 and a lower compartment 174. The housing is divided into two sections that are isolated from each other except for a connecting conduit 176 provided with dampers 178 which interconnect the two upper compartments and permit passage of hot air from one end to the other of the two compartment housing 170. A heater and blower assembly generally designated by the numeral 180 introduces hot air through a duct 182 into the compartment 172 with deflectors 184 directing the hot air longitudinally in the compartment 172 so that hot air will pass throughout the length of the compartment 172 through the duct 176 and thus expose the entire upper area 172 to hot air. The upper compartment 172 is separated from the lower compartment 174 by a partition wall or panel 186 and supporting ridge elements 188 which support the belts 136 on the top edge thereof and the laminated web 24. As illustrated in FIG. 3, the partition 186 is closely spaced from the side edges of the web 24 and the supporting elements 188 for the belts 136 to provide slot-like passage ways 189 for passage of hot air downwardly between the conveyor belt and web into the lower compartment 174. The lower compartment 174 of the housing 170 is not connected to each other but rather each component of the compartment 174 is provided with an outlet duct 190 and 192 respectively which may be controlled by a damper 194 and which enters into a return air duct 195 provided with a vacuum gauge 196 or the like so that the vacuum in both sections of the lower compartment 174 will be substantially the same thus circulating air through the burner and blower assembly 180 which may be of any suitable conventional construction having adequate capacity for properly drying the web. To provide appropriate distribution of the heated air, a plate 198 is provided in overlying relation to the web with perforations 200 therein to provide passage of heated air through the perforations or orifices so that the heated air will impinge on the web 24 at relatively high velocity thus drying the adhesive by evaporating moisture therein. At the discharge end of the dryer, the web emerges completely cured and firm enough to be sawed to length. The dryer utilizes a single blower assembly 180 to supply heated air under pressure to the top of the web 24 and maintain a vacuum in the lower part or compartment 174 of the drying tunnel housing 170 as it draws the air back to the furnace assembly 180 for reheating. As illustrated, a unique feature of the drying tunnel is that the return air system which draws the air that has been expended on the web back into the fan suction pulls the air through narrow and continuous slots 18 on each side of the traveling belt supports or platens. The width of the slots may be adjustable to enable the predetermined pressure drop to be formed and maintained. This negative pressure in the lower compartment or plenum 174 of the tunnel 170 acts to hold the web 24 in close contact with the travelling belts thus providing the necessary traction or pull to keep it moving through the machine without wrinkling. At the end of the housing 170, the web 24 is discharged and the belts 138 pass over an end pulley which is designated by numeral 202 of the same shape and configuration as the pulley 134 which is driven by a suitable drive motor 204 or the like. Suitable belt tightener, control device and the like are also provided for the supporting belts.

FIG. 10 illustrates the structure of the web 24 including three sheets or plies 24a, 24b and 24c which are secured together in overlying relation by a continuous coating of glue along glue surfaces 25. Thus, when the laminated web is corrugated before the adhesive is cured and while it is still soft, the fibers in each ply are incrementally stretched on the outside of the bend as indicated by the symbols (—) and the fibers on the inside of the bends are incrementally compressed as indicated by the symbols (+). During the sliding movement of the surfaces in relation to each other, the glue which is still wet separates the plies and acts as a lubricant between the plies thus permitting the fluting or forming actions to take place without requiring undue force. The rods engaging the upper surfaces of the corrugated panel, the belts and corresponding surfaces of the supporting ribs for the belts engaging the undersurface of the web effectively retains the shape and configuration of the corrugated panel from the point at which it is laminated and enters the fluting machine until the glue has been cured and the laminated corrugated panel exits from the dryer. Once the glue has been cured or set, the product maintains its shape and rigidity with no tendency of the flutes to flatten out after forming since this is prevented by the glue and in order to flatten out, the glue bond would have to fail. Further, the product of the present invention has a high strength because of the fact that a panel or web corrugated in the machine or longitudinal direction has greater strength and may be employed in various arrangements for packing purposes and the like. While the materials employed may vary, the paper board laminate may be composed of three or four plies of standard liner board bonded with a polyvinyl alcohol adhesive. The panel width is then completed and may be varied but one practical width employed is 17 inches with the pitch between convolutions being 1 1/16 inch and the vertical height of each flute being 3/4 inch. The strength of the panel is very high when rolled into a corner post or otherwise formed into a corner post for use in packaging various articles in containers or the like although many other uses of the invention are facilitated by the strength and sability of the product.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A machine for forming longitudinal corrugations in a web of sheet material, said machine comprising an elongated conveyor including a plurality of longitudinally extending, transversely spaced supporting belts for engagement with the undersurface of the sheet material, said belts converging toward each other toward the discharge end thereof, vacuum means for pulling the sheet material downwardly onto the belts with the portions of the sheet material between the belts being pulled downwardly between the belts, and a plurality of sheet material engaging means disposed in overlying relation to the sheet material and oriented between the belts for engagement with the upper surface of the sheet material and urging the sheet material between the belts downwardly whereby the belts supporting the inner surface of alternate ridges formed in the sheet material and the sheet material engaging means engaging the inner surface of the other ridges coact to form longitudinal corrugations in the web of sheet material.

2. The structure as defined in claim 1 together with means imparting a transversely extending convex curve to the sheet material as its enters the conveyor and also to impart a drag force thereon to eliminate wrinkling of the material when entering the conveyor.

3. The structure as defined in claim 1 wherein said conveyor conveys the corrugated sheet material through a dryer, said dryer including upper and lower compartments with the corrugated sheet material dividing the upper compartment from the lower compartment, air circulating means having an outlet discharging air into the upper compartment and a suction side taking air from the lower comporatment and including means heating the air to supply heated air to the upper surface of the sheet material and creating a negative pressure in the lower compartment for urging the corrugated sheet material against the conveyor extending through the dryer.

4. The structure as defined in claim 3 together with a partition plate overlying the corrugated sheet material in the dryer, said partition plate being perforated to discharge air toward the sheet material at a relatively high velocity for impingement thereon.

5. The structure as defined in claim 4 together with means defining restricted slots along each side of the sheet material during its passage through the dryer and communicating the upper and lower compartments to maintain a negative pressure in the lower compartment of the dryer.

6. The structure as defined in claim 1 wherein said means engaging the upper surface of the sheet material includes a plurality of elongated rods, and means exerting downward pressure on said rods.

7. The structure as defined in claim 6 wherein said means exerting pressure on said rods includes a plurality of adjustable pressure shoes engaging selective of said rods for providing uniform development of the corrugation in the sheet material.

8. The structure as defined in claim 6 wherein said means exerting pressure includes spring-loaded fingers biasing the sheet material engaging rods downwardly into the corrugations for uniform development thereof.

References Cited

UNITED STATES PATENTS

| | | | |
|---|---|---|---|
| 3,178,494 | 4/1965 | Tisdale | 156—462 X |
| 2,166,749 | 7/1939 | Burrill | 161—133 UX |
| 2,640,517 | 6/1953 | Mello | 156—591 UX |
| 2,285,617 | 6/1942 | Schwartz | 156—594 X |
| 2,655,978 | 10/1953 | Gonda et al. | 264—286 X |
| 3,369,955 | 2/1968 | Rudloff | 156—595 X |

WILLIAM A. POWELL, Primary Examiner

U.S. Cl. X.R.

18—19; 156—200, 382, 594; 161—135; 264—90, 286